June 25, 1963   A. J. FITZGERALD   3,095,241
WHEEL COVER CONSTRUCTION
Filed Jan. 15, 1963
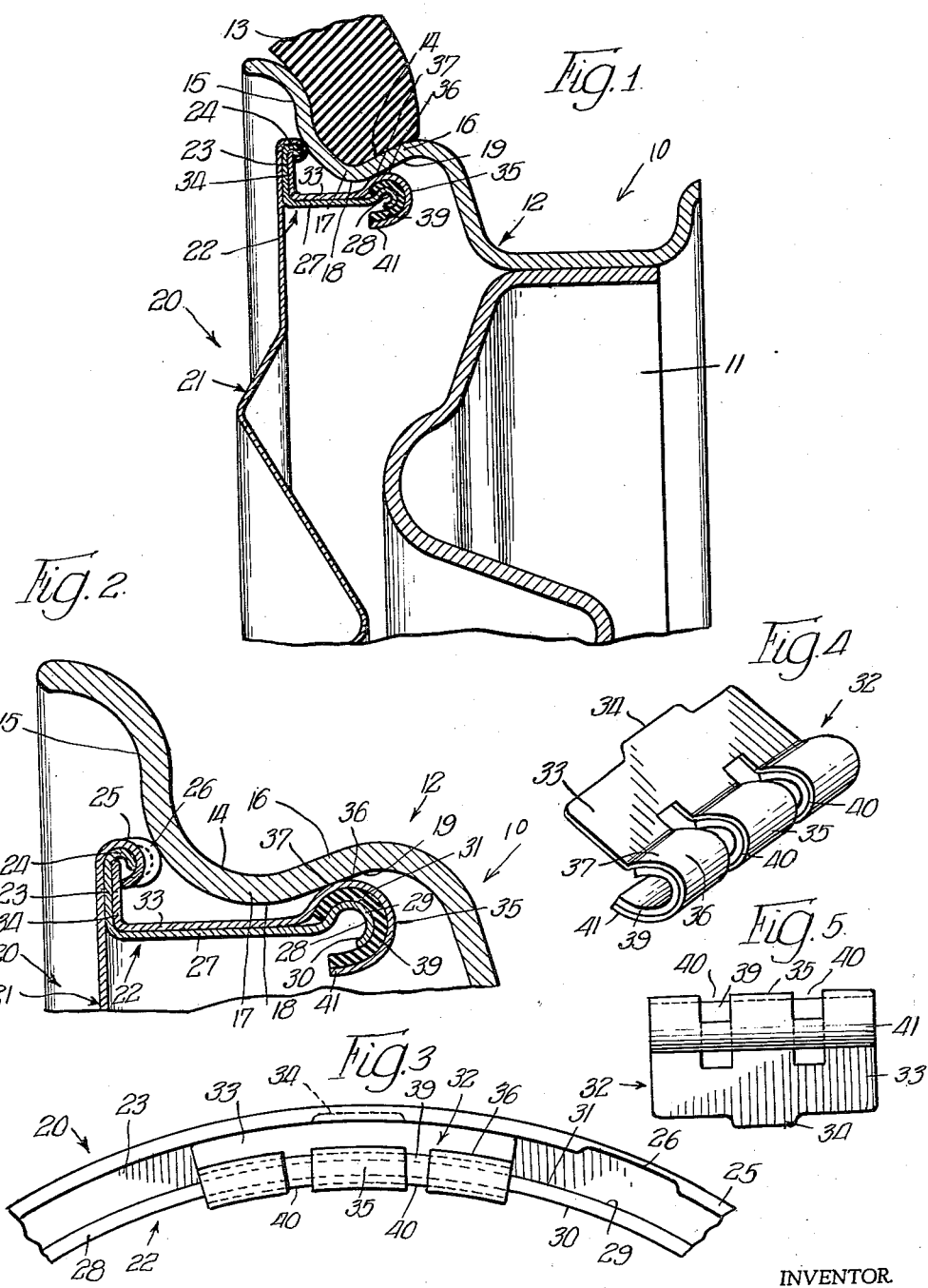
INVENTOR.
Albert J. Fitzgerald,
BY
Robert R. Lockwood
atty

United States Patent Office 3,095,241
Patented June 25, 1963

3,095,241
WHEEL COVER CONSTRUCTION
Albert J. Fitzgerald, Cranston, R.I., assignor to Thompson Industries, Inc., Indianapolis, Ind., a corporation of Massachusetts
Filed Jan. 15, 1963, Ser. No. 251,556
6 Claims. (Cl. 301—37)

This invention relates to the construction of covers for automobile wheels.

Among the objects of this invention are: To provide a new and improved wheel cover construction that is simple and efficient in application and which can be readily and economically manufactured and installed; to increase the frictional grip between a wheel cover and the rim of the wheel on which it is mounted; and to accomplish this by providing a plurality of clips located in spaced relation along the distal edge of a retaining ring on the cover with a layer of resilient material therebetween.

In the drawing:

FIG. 1 is a vertical sectional view through a portion of a conventional automobile wheel, showing a portion of the tire, to which a wheel cover embodying the present invention is applied.

FIG. 2 is a view, similar to FIG. 1, but showing the details of construction at an enlarged scale.

FIG. 3 is an elevational view of an arcuate section of the wheel cover looking from right to left as viewed in FIGS. 1 and 2.

FIG. 4 is a perspective view at an enlarged scale of a retainer clip used in the construction shown in the preceding figures.

FIG. 5 is a bottom plan view of the retainer clip provided with a layer of resilient material secured thereto.

Referring now particularly to FIGS. 1 and 2 of the drawing, it will be observed that the reference character 10 designates, generally, a portion of an automobile wheel of conventional construction having a central portion, indicated at 11, that is welded about its periphery to a drop center rim, indicated at 12, that is arranged to receive a conventional automobile tire 13 of which only a portion of a side wall is shown. The side wall of the tire 13 interfits with a groove 14 that is formed between a marginal outwardly inclined annular flange 15 and an intermediate radially outwardly inclined rim section 16 which together provide a convex annular rib 17. The convex annular rib 17 has its innermost surface 18 lying along a circle to which reference will be made presently. Also reference will be made to an inclined wheel cover retaining surface 19 that is located on the inner side of the rim section 16.

Arranged for detachable mounting on the automobile wheel 10 is a wheel cover that is shown, generally, at 20. The wheel cover 20 includes a front face 21 that is die shaped into a pleasing design and it overlies the central portion 11 of the wheel 10 and a major portion of the rim 12. Extending laterally from the front face 21 is a retaining ring that is indicated, generally, at 22. The retaining ring 22 can be formed integrally with the front face 21 or as a separate part and secured thereto as disclosed herein. The retaining ring 22 has an annular outwardly extending flange 23 which overlies the inner side of the front face 21 near its periphery. The flange 23 has a marginal flange bead 24 over which an outer edge 25 of the front face 21 is rolled to securely hold the retaining ring 22 in position on the front face 21. Nubbins 26 are formed at spaced locations along the rolled outer edge 25 of the front face 21 for the purpose of spacing it from the juxtaposed surface of the marginal flange 15.

In the various figures of the drawing it will be observed that the retaining ring 22 has a cylindrical intermediate section 27 the outer diameter of which is substantially less than the diameter of the circle along the innermost surface 18 of the convex annular rib 17. Along the distal edge of the intermediate section 27 there is a reinforcing bead 28 which, as shown more clearly in FIG. 2, includes an outturned section 29 and an inturned section 30. The diameter of the circle containing the outermost surface portion 31 of the reinforcing bead 28 approaches or is substantially the same as the diameter of the circle along the innermost surface 18 of the convex annular rib 17.

In order to hold the wheel cover 20 in position on the wheel 10 clips, one of which is shown generally at 32, are provided in uniform spaced relation along the retaining ring 22. Preferably three or more of the clips 32 are employed and they are formed of corrosion resisting material such as stainless steel. Each clip 32 includes an intermediate flat portion 33 that overlies the outer surface of the cylindrical intermediate section of the retaining ring 22. To one side of the intermediate flat portion 33 is an upstanding tab 34 which overlies the annular outwardly extending flange 23. The tab 34 extends underneath the rolled outer edge 25 of the front face 21 and is thereby held securely in position on the retaining ring 22. If desired, the intermediate flat portion 33 can be riveted or welded to the underlying cylindrical intermediate section 27.

Each clip 32 has along the opposite side of the intermediate flat portion 33 an integral extension in the form of a reverse curved outer section 35 that conforms generally to the cross sectional configuration of the reinforcing bead 28. Its inner surface is spaced from the outer surface of the bead 28 for a purpose that will be apparent presently. The outermost surface portion 36 of the reverse curved outer section 35 lies along a circle whose diameter is somewhat greater than the diameter of the circle along the innermost surface 18 of the convex annular rib 17. This arrangement provides a holding surface 37 on each clip 32 that bears against the inclined wheel cover retaining surface 19 on the convex annular rib 17.

As pointed out above the reverse curved outer section 35 of each clip 32 is spaced from the underlying portion of the reinforcing bead 28. Located in the space thus provided is a layer 39 of resilient material, such as rubber. The layer 39 is secured to the inner side of the reverse curved outer section 35 by suitable means to provide an integral construction with the clip 32. Since the layer 39 of resilient material is somewhat compressible, it facilitates the application of the wheel cover 20 to the wheel 10 by permitting the reverse curved outer section 35 of each of the clips 32 to be sprung inwardly as they are forced past the innermost surface 18 of the convex annular rib 17. When the wheel cover 20 is in the fully applied position as shown in FIGS. 1 and 2, the layer 39 of resilient material urges the overlying reverse curved outer section 35 radially outwardly into gripping engagement with the inclined wheel cover retaining surface 19. In order to improve the flexibility of the reverse curved outer section 35 of each clip 32 it is transversely slotted as indicated at 40—40. The transverse slots 40—40 extend at one end into the intermediate flat portion 33 and at the other end are spaced from the outer edge portion 41 of the reverse curved outer section 35 which together with the overlying portion of the layer 39 of resilient material extends well beyond the outer edge of the inturned section 30 of the reinforcing bead 28.

By providing the layer 39 of resilient material in the manner described the application of the wheel cover 20 to the wheel 10 is facilitated. Also its removal is facilitated while the gripping action against the inclined wheel cover retaining surface 19 is sufficient to insure that the wheel cover 20 will not become dislodged under normal operating conditions.

What is claimed as new is:

1. In combination,
   (a) an automobile wheel having a tire receiving rim provided with a convex radially inwardly facing annular rib having a radially outwardly inclined surface on its inner side,
   (b) a wheel cover overlying said wheel on the outer side of said rib and having an annular retaining ring extending laterally from near the peripheral edge thereof in radially inwardly spaced relation to and beyond said convex annular rib,
   (c) a bead along the distal edge of said retaining ring constituting an integral extension thereof and spaced from said convex annular rib, said bead having an out turned section merging with an in turned section and an outer diameter not more than the inner diameter of said convex annular rib,
   (d) a plurality of clips secured in spaced relation along said ring and conforming generally to the cross sectional configuration of and spaced outwardly from said bead with their outermost surface portions along a circle whose diameter is slightly greater than the inner diameter of said convex annular rib, and
   (e) resilient means interposed between the juxtaposed surfaces of said bead and of said clips.

2. The invention, as set forth in claim 1, wherein the resilient means comprises a layer of resilient material individual to each clip.

3. The invention, as set forth in claim 2, wherein each clip and its layer of resilient material overlie that portion of the bead individual thereto and extend beyond the outer edge of its in turned section.

4. The invention, as set forth in claim 2, wherein each clip is slotted transversely of that portion thereof overlying the bead.

5. The invention, as set forth in claim 4, wherein each clip has a pair of slots and they expose the layer of resilient material.

6. The invention, as set forth in claim 2, wherein:
   (a) the annular retaining ring is separate and distinct from the wheel cover and is secured thereto along its periphery, and
   (b) each clip has an intermediate section extending from that portion thereof overlying the bead on said retaining ring and a tab extending from said intermediate section and secured to said wheel cover along with said retaining ring.

References Cited in the file of this patent

UNITED STATES PATENTS

| | | |
|---|---|---|
| 2,440,638 | Lyon | Apr. 27, 1948 |
| 2,809,076 | Plotkin | Oct. 8, 1957 |
| 2,903,300 | Hurd | Sept. 8, 1959 |